United States Patent
Buyukdura et al.

(10) Patent No.: US 6,907,274 B1
(45) Date of Patent: Jun. 14, 2005

(54) METHODS AND SYSTEMS FOR USING NETWORK CAPABILITIES TO CORRECT PHONE DISPLAYS

(76) Inventors: Feza Buyukdura, 22010 NE. 143rd St., Woodinville, King County, WA (US) 98072; Bryan Sullivan, 4082 325th Ave. NE., Carnation, King, WA (US) 98014

( * ) Notice: Subject to any disclaimer, the term of this patent is extended or adjusted under 35 U.S.C. 154(b) by 350 days.

(21) Appl. No.: 09/739,044

(22) Filed: Dec. 18, 2000

(51) Int. Cl.[7] ............................. H04B 1/38; H04M 1/00
(52) U.S. Cl. ...................................... 455/566; 455/415
(58) Field of Search ........................... 455/414.1, 414.4, 455/415, 517, 566, 560, 561, 417; 379/142.01, 142.14, 142.04

(56) References Cited

U.S. PATENT DOCUMENTS

| | | |
|---|---|---|
| 4,582,956 A | 4/1986 | Doughty |
| 4,776,005 A | 10/1988 | Petriccione et al. |
| 4,924,496 A | 5/1990 | Figa et al. |
| 5,265,145 A | 11/1993 | Lim |
| 5,502,757 A | 3/1996 | Bales et al. |
| 5,546,447 A | 8/1996 | Skarbo et al. |
| 5,696,815 A | 12/1997 | Smyk |
| 5,742,905 A * | 4/1998 | Pepe et al. ................... 455/461 |
| 5,761,279 A * | 6/1998 | Bierman et al. ....... 379/142.04 |
| 5,864,612 A | 1/1999 | Strauss et al. |
| 5,872,926 A * | 2/1999 | Levac et al. ................. 709/206 |
| 6,005,927 A * | 12/1999 | Rahrer et al. .......... 379/142.01 |
| 6,393,296 B1 * | 5/2002 | Sabnani et al. .............. 455/466 |

OTHER PUBLICATIONS

Michael Slawson, "Caller ID Basics," 10 pp. [Downloaded from the World Wide Web on Jan. 14, 2004.].

* cited by examiner

*Primary Examiner*—Quochien B. Vuong
(74) *Attorney, Agent, or Firm*—Klarquist Sparkman, LLP

(57) ABSTRACT

A system and method for displaying phone number in the correct format on a personal communication system (PCS) device is disclosed. Since many devices which access PCS networks do not send identifying phone number information for the device in a format recognized by the network, oftentimes the phone numbers of the sending devices cannot be displayed on the PCS device. The present invention provides an algorithm engine which searches to determine whether the incoming phone number is in a format recognized by the network, and if not formats the phone number in the correct format for the PCS device for display thereon.

25 Claims, 2 Drawing Sheets

METHODS AND SYSTEMS FOR USING NETWORK CAPABILITIES TO CORRECT PHONE DISPLAYS

BACKGROUND OF THE INVENTION

1. Field of the Invention

This invention relates generally to methods and systems for using network capabilities to correct displays of electronic devices. More specifically, the invention relates to algorithms for correcting displays of electronic devices that have varied display formats that are not necessarily compatible with the format used by the network.

2. Description of the Related Art

The wireless revolution has created a varied number of personal communication devices which interface with networks of all kinds and which provide sundry information to the users of such devices along with the data, voice or other information sent over the network to the personal communication devices. Mobile telephones, personal digital assistants (PDA), laptop computers, desktop computers, beepers, wireless telephones and other portable devices all are in use today and provide different types of information to their users. Needless to say, worldwide there are many manufacturers of such personal communication devices and networks, and each of these manufacturers potentially uses a different protocol and/or format for sending and displaying information on the devices through the network.

A problem which arises in this environment is that oftentimes the display message generated by the network for display on the personal communication device is not compatible with the formats programmed into the personal communication device and so the device cannot fully, if at all, display the desired information sent by the network. For example, with respect to personal communication services (PCS) mobile telephones, this problem usually manifests itself by truncating the display of the incoming telephone number. This occurs since there is no single format for telephone numbers that may be broadcast by the network that permits all types of PCS mobile phones to display the calling name and number information even though this information is always sent by the network to the receiving PCS mobile phone.

It has been suggested that the users of existing PCS mobile phones be asked to simply return their phones to the places of purchase or service for reprogramming with the particular new networks protocols and formats. However, this is not a viable solution since it is not realistic to expect users to take the time to return their phones for reprogramming, and it is neither feasible nor economical for network providers to engage in wholesale reprogramming efforts.

Other solutions to this problem involve displaying both the calling name and phone number at the level of the individual PCS mobile phone. Such a solution requires that the PCS mobile phone be associated with a computer database that maintains a directory of calling names which are cross-referenced to the universe of potential calling phone numbers. This requires that the memory of an individual PCS mobile phone be sufficiently large to accommodate the database. Thus, the costs of the PCS mobile phone will be increased when this solution is implemented. Moreover, the memory of existing individual PCS telephones cannot in any event display the calling information of a first-time caller. This information must first be supplied by the network, but this information simply may not be in the correct format of the PCS mobile phone. Additionally, all of the above referred to solutions require retrofitting to already-existing equipment which is a costly and time-consuming process.

There thus exists a long-felt need for methods and systems for allowing all relevant information sent by a network to a personal communication device to be displayed on the device regardless of format incompatibility or mismatches between the device and the network. Such systems and methods should be economical to implement and should not burden the user of the personal communication device with the responsibility of returning to the point-of-purchase or service for reprogramming. It is desirable that solutions to this problem also be economical to the network administrator, and that such solutions not require the need for retrofitting the network with additional hardware or more extensive software. These needs have not heretofore been achieved in the art.

SUMMARY OF THE INVENTION

The aforementioned problems are solved and long-felt needs are met by systems and methods provided in accordance with the present invention for displaying information in correct format from a sender of the information in a telecommunication system. A receiving point is provided for receiving from a sending unit the information which it is desired to display on a receiving unit, wherein the information may not be in a format that is recognizable by the receiving unit. A computer processor in communication with the receiving point determines whether the received information is in a format recognizable by the receiving unit, and an algorithm engine in communication with the computer processor generates a correct format for the received information, whereby when the computer processor determines that the information is not in a correct format, the algorithm engine formats the received information to the correct format for the receiving unit and the receiving point forwards the correctly formatted information to the receiving unit.

The present invention provides an efficient way to ensure that information which must be displayed on a receiving unit is displayed in detail, and in the correct format. Moreover, the invention is usable in existing networks and can be adapted to format the telephone number of any device for display. Such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters identify similar elements throughout the several views.

DETAILED DESCRIPTION OF THE PREFERRED EMBODIMENTS

Figure 1:
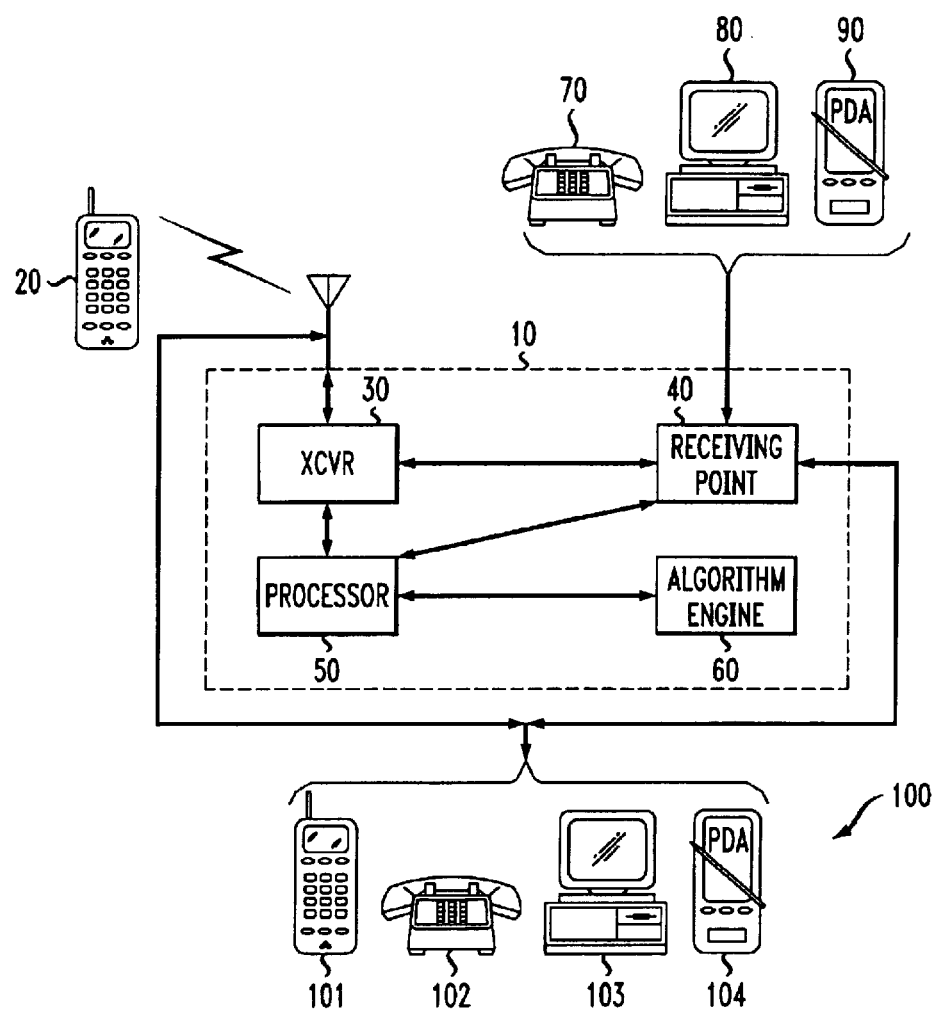
FIG. 1 is a block diagram of a network provided in accordance with the present invention for formatting and displaying information in a correct format for a receiver.

Referring now to FIG. 1, a system for displaying information from a sender of the information is depicted. In a preferred embodiment, the system is operable to display information on display screens of devices utilizing a network wherein the information may be received by the network in a format which is not recognized by the network. A system 10 to receive the information preferably places the information in a correct format for display. The system 10 receives from a sender of the information 20 a message or other form of data communication. The sender 20 may be a cellular, wireless or digital phone, or any other device 70, 80, or 90 which is operable to communicate with system 10 and which is adapted to send information to system 10. While any type of information from device 20 may be received and displayed in the correct format by system 10, preferably the system 10 receives display information from device 20 which it is desired to display by system 10. The display information is, for example but not intending to limit the invention in any way, phone numbers of the device 20 in the network.

For instance, when a cellular or wireless device 20 sends the initial message, a transceiver 30 receives the message and forwards the message to a receiving point 40 which collects all such messages for further processing. Other devices such as a handset 70, personal or laptop computer 80, or a PDA 90 may also send messages and other information or data which is first received by system 10 at the receiving point 40. Other devices may also send messages. The receiving point 40 may be a database, cache or other temporary or permanent storage device or register which is adapted to store data for further processing.

Once the information is received from devices 20, 70, 80, 90, the receiving point determines whether the information, for example the devices phone number, is in a format which recognized by the system and which may therefore be displayed without any additional manipulation. The receiving point 40 may be built with some special intelligence capabilities to make this determination, or alternatively a processor 50 may be provided to make this determination. Processor 50 may be any type of standard, digital computer which is operable to operate software programs necessary to support the functionality of system 10. For example, a COMPAQ Computer Corp. (Houston, Tex.) PROLIANT server, or servers available from Sun Microsystems, Inc. may be employed to perform these tasks.

When it is determined that the phone number's format received by the receiving point 40 is not recognized by system 10, processor 50 invokes a search of an algorithm engine 60 which has programmed or otherwise stored therein a set of algorithms that allow unrecognized display formats to be converted to formats that are recognizable by the system 10 and which can be displayed. The algorithm engine 60 works in conjunction with processor 50 to search for a recognized format and then places the received information, usually a phone number of the sending device 20, 70, 80, 90, into a format that is displayable on a receiving device 100, for example a wireless or cellular phone 101, a standard handset 102, a personal computer or laptop 103, or a PDA 104.

To accomplish this task, processor 50 and algorithm engine 60 are programmed with searching and other necessary software which is invoked by the system 10 to determine if the phone number is in a recognized format and to place the phone number in a format for display. This software may be customized software that is run on the processor 50 and is programmed in the appropriate software language such as C++, VISUALBASIC, HTML or other languages. Moreover, any type of server environment such as UNIX or WINDOWS may support the software and the inventive methods. Those skilled in the art will appreciate that any such software languages and environments are within the scope of the inventive methods.

The display devices 100 will then preferably display the phone number on a display screen or other associated element in the correct format. The system 10 may output to the display devices 100 any phone numbers for which a corrected format has been found and to which the corrected format has been applied. The algorithm engine 60 may be reprogrammed and/or updated with new corrected formats periodically and therefore new devices 100 will be able to receive calling telephone numbers in corrected formats when the corrected formats become available. Thus, the inventive system 10 is versatile and can be used very easily with existing networks.

Figure 2:
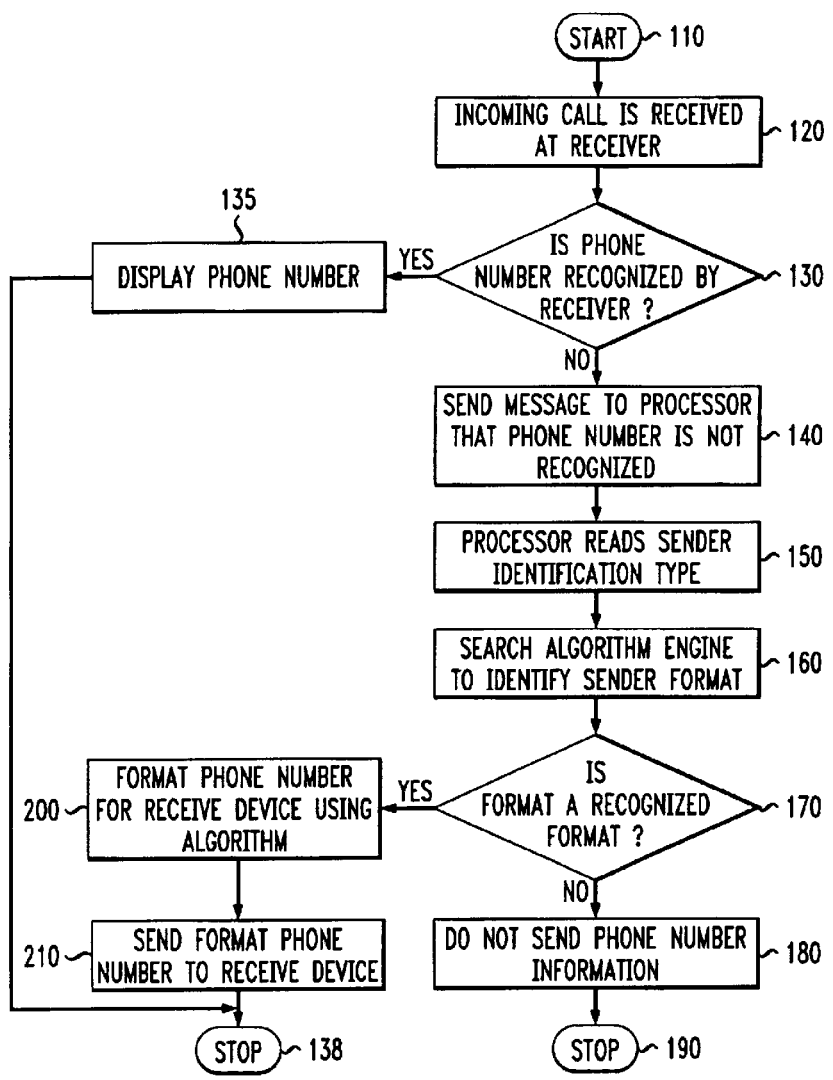
FIG. 2 is a block diagram of a preferred method of the present invention for formatting information in a correct format

As mentioned above, the inventive methods are preferably implemented in software and run on general purpose, digital computers or servers. Whichever server or software language is so employed, FIG. 2 depicts a flow chart of a preferred embodiment of the inventive methods. The methods start at step 110, and at step 120 an incoming call is received at the receiving point (hereinafter referred to as "the receiver"). It is then determined at step 130 if the phone number of the incoming call is recognized by the receiver. If so, then at step 135 the phone number is forwarded to the display device which the caller is trying to reach and the incoming phone number is displayed in the correct format on the display device. The method then ends at step 138.

If not, then at step 140 a message is sent to the processor that the incoming phone number is not in a format recognized by the system. The processor then reads at step 150 a sender identification type which is associated with the incoming telephone call. The sender identification type is a code that is appended to the incoming phone number that tells the processor what kind of device sent the incoming call. The processor then invokes the search engine at step 160 to perform a search of this sender identification type so that the phone number of the incoming call can be formatted according to the requirements of the device that sent the incoming call.

It is then determined at step 170 whether the format for this sender identification type is recognized by the search engine and may therefore be formatted for display. If not, then at step 180 the incoming phone number is not sent to the receiving device for display and the method stops at step 190. If so, then at step 200 the incoming phone number is formatted using a stored algorithm in the search engine. The correctly formatted phone number is then sent at step 210 to the receive device and the method then stops at step 138.

Thus, the inventive methods and systems provide efficient ways to ensure that information which must be displayed on a receiving unit is displayed in detail, and in the correct format. Moreover, the invention is usable in existing networks and can be adapted to format and display the telephone number of any sending device. These results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A system for displaying information in correct format, the system comprising:

a receiving point for receiving information about a call originating from a first device;

a computer processor in communication with the receiving point for determining whether the received information is in a format recognizable for correct display by a second device, wherein the determining is based at least in part on consideration of display characteristics of the second device; and an algorithm engine in communication with the computer processor for selectively adjusting the received information based at least in part on the display characteristics of the second device, whereby when the computer processor determines that the received information is not in the recognizable format, the algorithm engine adjusts the received information to the recognizable format and the receiving point forwards the correctly formatted information to the second device.

2. The system recited in claim 1, wherein the receiving point comprises a database.

3. The system recited in claim 1, wherein the receiving point comprises a cache memory.

4. The system recited in claim 1, further comprising a transceiver for receiving the information.

5. The system recited in claim 4, wherein the information comprises a phone number.

6. The system recited in claim 5, wherein the information further comprises a name associated with the phone number.

7. The system recited in claim 1, wherein the first and second devices are mobile telephones.

8. The system recited in claim 1, wherein the first device does not specify to the system any device characteristics of the second device.

9. A method for displaying information on a display in a correct format for a call between first and second devices, comprising the steps of:

receiving information and determining whether the information is in a format recognizable for correct display by the second device, wherein the information comprises a phone number associated with the first device, and wherein the determining is based at least in part on consideration of display characteristics of the second device;

searching a set of algorithms for a correct display format if it is determined that the information is not in the recognizable format;

formatting the information in the correct display format as determined by the searching step; and forwarding the correctly formatted information to the second device for display in the correct display format.

10. The method recited in claim 9, further comprising the step of sending a message to a processor if it is determined that the information is not in the recognizable format.

11. The method recited in claim 9, wherein the formatting step further comprises reading a sender identification type associated with the phone number.

12. The method recited in claim 11, wherein the searching step further comprises matching the sender identification type with an algorithm in the set of algorithms.

13. The method recited in claim 12, further comprising the step of displaying the phone number by the second device if it is determined by the receiving step that the phone number is in the recognizable format.

14. A computer-readable medium storing computer-executable instructions for causing a computer system programmed thereby to perform the method recited in claim 9.

15. The method recited in claim 9, wherein the information further comprises a name associated with the phone number.

16. The method recited in claim 9, wherein the first and second devices are mobile telephones.

17. The method recited in claim 9, wherein the first device does not specify for the determining, searching, or formatting any device characteristics of the second device.

18. In a computer system, a computer-implemented method comprising:

receiving information about a call originating from a first device;

evaluating display correctness for display of the information by a second device, wherein the evaluating depends at least in part on display characteristics of the second device;

if necessary to correct the display of the information by the second device, adjusting the information based at least in part on the display characteristics of the second device; and forwarding the information to the second device.

19. A computer-readable medium storing computer-executable instructions for causing the computer system to perform the method of claim 18.

20. The method of claim 18 wherein the information includes a phone number associated with the first device.

21. The method of claim 20 wherein the information further includes a name associated with the phone number.

22. The method of claim 18 wherein the adjusting is further based at least in part on device characteristics of the first device.

23. The method of claim 18 wherein the computer system is a node of a telecommunications network.

24. The method of claim 18 wherein the first and second devices are mobile telephones.

25. The method of claim 18 wherein the first device does not specify to the computer system any device characteristics of the second device.

* * * * *